E. WEBBER.
MILKING-STOOL.
No. 173,247.  Patented Feb. 8, 1876.
Fig. 1.
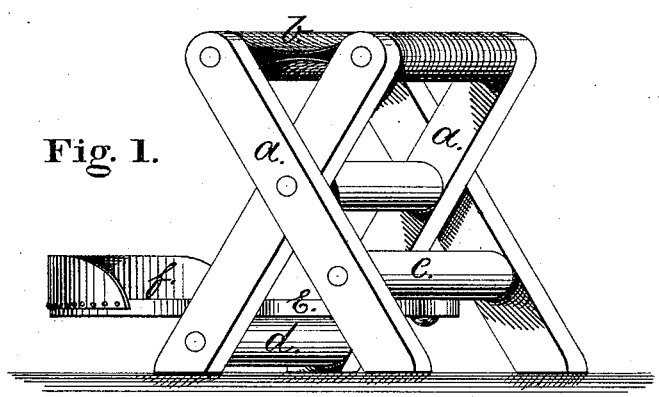
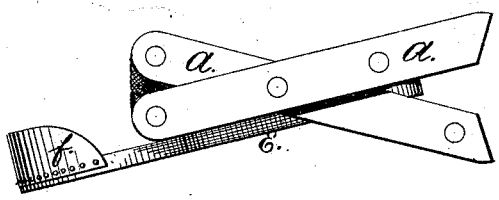
Fig. 2.
WITNESSES.  INVENTOR.
J. A. Miller Jr.  Elbridge Webber
L. P. Langworthy  by Joseph A. Miller
  Attorney.

UNITED STATES PATENT OFFICE.

ELBRIDGE WEBBER, OF GARDINER, MAINE, ASSIGNOR TO HENRY A. STEARNS, OF LINCOLN, RHODE ISLAND.

IMPROVEMENT IN MILKING-STOOLS.

Specification forming part of Letters Patent No. 173,247, dated February 8, 1876; application filed November 3, 1875.

*To all whom it may concern:*

Be it known that I, ELBRIDGE WEBBER, of Gardiner, in the county of Kennebec and State of Maine, have invented certain new and useful Improvements in Milking-Stools; and I hereby declare that the following is a full, clear, and exact description of the same, which will enable others skilled in the art to make and use the same, reference being had to the accompanying drawings, forming part of this specification.

Figure 1 is a perspective view of my improved milking-stool when open for use. Fig. 2 shows the same when folded up for transportation.

The object of this invention is to provide a milking-stool which can be folded up, is easily carried, forms a convenient seat, and also a shelf for supporting the milking-pail above the floor or ground, and which can be readily adjusted to any required position.

The nature of the invention consists in the arrangement of different parts, so as to accomplish the objects desired, as will be more fully set forth hereinafter.

In the drawings, *a a* is a folding camp-stool, made in the usual manner. *b* is the seat thereof, made of any suitable material which will allow the stool to be folded up, as shown in Fig. 2. *c* is one of the lower rounds, placed somewhat higher than the opposite round *d*. The round *c* is made to turn in the holes where the same is secured to the legs of the camp-stool, and to the lower part of the round *c* the arm *e* is secured by a screw or pin. The arm *e* rests on the round *d*, and projects beyond the same sufficient to receive the milking-pail; and for this purpose that part of the arm *e* is enlarged, so that the pail can rest firmly on the same; and, to further secure the pail, a guard, *f*, is placed around a portion of the projecting arm *e*. As the arm *e* is secured by a screw or pin under the round *c*, and supported on the round *d*, the projecting end, supporting the milk-pail, can be swung from side to side, so that when the milker has taken his seat on the stool the milking-pail may be placed on the arm *e* at *f*, and swung into the desired position to facilitate the process of milking.

By supporting the pail on the projecting arm *e* the milker is relieved of the same, and the pail is raised up in the proper position, and protected against dirt and stable filth. The position of the person milking is more easy, and the operation less laborious. When the milking is completed the stool can be folded up, as shown in Fig. 2, and conveniently carried to, and stored away in, any desired place. It will thus be always clean, and ready for use.

Having thus described my invention, I claim as new and desire to secure by Letters Patent—

The combination, with the folding camp-stool *a*, of the laterally-adjustable arm *e*, adapted to support the milking-pail, and provided with the guard *f*, substantially as described.

ELBRIDGE WEBBER.

Witnesses:
JOSEPH A. MILLER,
HORACE F. HORTON.